(12) United States Patent
Wang et al.

(10) Patent No.: US 11,228,902 B2
(45) Date of Patent: Jan. 18, 2022

(54) SYSTEMS AND METHODS FOR PERFORMING CARRIER AGGREGATION IN SIDELINK COMMUNICATIONS

(71) Applicant: ZTE CORPORATION, Guangdong (CN)

(72) Inventors: Mengzhen Wang, Guangdong (CN); Lin Chen, Guangdong (CN); Ying Huang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/354,677

(22) Filed: Mar. 15, 2019

(65) Prior Publication Data

US 2019/0215685 A1 Jul. 11, 2019

Related U.S. Application Data

(63) Continuation of application No. PCT/CN2017/104058, filed on Sep. 28, 2017.

(51) Int. Cl.
| | |
|---|---|
| *H04W 8/30* | (2009.01) |
| *H04W 72/02* | (2009.01) |
| *H04W 4/40* | (2018.01) |
| *H04W 8/22* | (2009.01) |
| *H04W 80/02* | (2009.01) |
| *H04W 80/08* | (2009.01) |
| *H04W 24/04* | (2009.01) |

(52) U.S. Cl.
CPC .............. *H04W 8/30* (2013.01); *H04W 4/40* (2018.02); *H04W 8/22* (2013.01); *H04W 72/02* (2013.01); *H04W 80/02* (2013.01); *H04W 80/08* (2013.01); *H04W 24/04* (2013.01)

(58) Field of Classification Search
CPC ......... H04W 8/30; H04W 72/02; H04W 4/40; H04W 8/22; H04W 80/02; H04W 80/08; H04W 24/04
See application file for complete search history.

(56) References Cited

U.S. PATENT DOCUMENTS

| | | | | |
|---|---|---|---|---|
| 2018/0124612 | A1* | 5/2018 | Babaei | H04W 16/14 |
| 2020/0053675 | A1* | 2/2020 | Khoryaev | H04W 56/00 |

OTHER PUBLICATIONS

Huawei, Correction on congestion control for V2X sidelink communication in TS 36.321 (Opt 2), 3GPP TSG-RAN WG2 Meeting #99 R2-1707961 Berlin, Germany, Aug. 21-25, 2017 (Year: 2017).*

(Continued)

*Primary Examiner* — Mounir Moutaouakil
(74) *Attorney, Agent, or Firm* — Duane Morris LLP

(57) ABSTRACT

Systems and methods for performing carrier aggregation in wireless sidelink communications are disclosed herein. In one embodiment, a method performed by a first node is disclosed. The method comprises: obtaining configuration information related to sidelink data transmission between the first node and at least one second node, wherein the configuration information comprises one or more rules related to carrier aggregation for the sidelink data transmission, wherein the one or more rules comprise information related to a reliability level associated with the sidelink data transmission; and transmitting the sidelink data to the at least one second node on a plurality of carriers based on the configuration information.

19 Claims, 16 Drawing Sheets

140

(56) References Cited

OTHER PUBLICATIONS

Huawei, Correction on congestion control for V2X sidelink communication in TS 36.321 (Opt1), 3GPP TSG-RAN WG2 Meeting #99 R2-1707960 Berlin, Germany, Aug. 21-25, 2017 (Year: 2017).*
CATT, Considerations on PC5 Carrier Aggregation, 3GPP TSG-RAN WG2 Meeting #99 R2-1708055, Berlin, Germany, Aug. 21-25, 2017 (Year: 2017).*
OPPO, Discussion on Service and Carrier Mapping for PC5 CA in eV2X, 3GPP TSG-RAN WG2#99 R2-1708039, Berlin, Germany, Aug. 22-26, 2017 (Year: 2017).*
CATT, Carrier configuration and carrier selection in eV2XCA, 3GPP TSG-RAN WG2#99 R2-1708052, Berlin, Germany, Aug. 21-25, 2017 (Year: 2017).*
Extended European Search Report dated Jun. 27, 2019, in corresponding European Patent Application No. 17926842.0.
ZTE: "Discussion on PC5 carrier aggregation"; 3GPP TSG-RAN WG2 Meeting #99, Berlin, Germany Aug. 21-25, 2017, R2-1708509, 6 pages.

* cited by examiner

SYSTEMS AND METHODS FOR PERFORMING CARRIER AGGREGATION IN SIDELINK COMMUNICATIONS

CROSS-REFERENCE TO RELATED APPLICATION

The present application claims priority to PCT international application PCT/CN2017/104058, entitled "SYSTEMS AND METHODS FOR PERFORMING CARRIER AGGREGATION IN SIDELINK COMMUNICATIONS," filed on Sep. 28, 2017, which is expressly incorporated by reference herein in its entirety.

TECHNICAL FIELD

The disclosure relates generally to wireless communications and, more particularly, to systems and methods for performing carrier aggregation in wireless sidelink communications.

BACKGROUND

With the increase in the number of vehicles, people pay more and more attention on how to reduce traffic accidents, how to rescue timely and how to coordinate on-site traffic, etc. With the development of communication technology, more and more vehicles are equipped with vehicle communication modules. Through such vehicle equipment, there can be a variety of information exchanges, such as accident pre-warning information, traffic status reminder information, etc. Based on the pre-cash sensing warning system and through the use of advanced wireless communication technology, it is expected to achieve real-time information exchange between vehicle and vehicle, vehicle and roadside unit. In addition, it is likely to inform each other's current state (such as vehicle geographical location, speed, acceleration and direction) and road environment information. A variety of collision warning information can be provided to prevent the occurrence of road traffic safety accidents.

Car network communication can be divided into several modes: Vehicle-to-Vehicle (V2V) communications, Vehicle-to-Pedestrian (V2P) communications, Vehicle-to-Infrastructure (V2I) communications, Vehicle-to-Network (V2N) communications, where the above-mentioned car network communication modes can be collectively referred to as Vehicle-to-Everything (V2X) communications. In the V2X communication study based on LTE (Long Term Evolution) organized by 3GPP (3rd Generation Partnership Project), V2X communication based on sidelink between user equipment (UE) and UE is one way to realize the V2X standard. That is, business data is not forwarded through the base station (BS) and the core network, but directly sent from the source UE through the air interface to the target UE. This V2X communication is referred to as sidelink-based V2X communication.

In order to support the technological and societal change in the near future for automotive vehicles, more V2X use cases and corresponding service requirements are identified to support enhanced V2X services. The eV2X use cases can be divided into five families of use scenarios: platooning, extended sensors, remote driving, automated driving and general case. They have different requirements on latency (3 ms~500 ms), reliability (90%~99.999%), message size (50~2 MByte), data rate (0.55 Mbps~1 Gbps) and transmission range (variable with vehicle speed). These eV2X services are featured by low latency, high reliability and high data rate.

In order to support these eV2X services, PC5 Carrier Aggregation (CA) is proposed to achieve high reliability and high data rate. CA denotes that two or more Component Carriers (CCs) are aggregated in order to support wider transmission bandwidths. When it comes to PC5 CA, it means that vehicle UE may simultaneously perform sidelink reception or transmission on one or multiple PC5 CCs. But there has been no existing effective solution to realize data split and/or data duplication based on PC5 CA.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first node is disclosed. The method comprises: obtaining configuration information related to sidelink data transmission between the first node and at least one second node, wherein the configuration information comprises one or more rules related to carrier aggregation for the sidelink data transmission, wherein the one or more rules comprise information related to a reliability level associated with the sidelink data transmission; and transmitting the sidelink data to the at least one second node on a plurality of carriers based on the configuration information.

In another embodiment, a method performed by a first node is disclosed. The method comprises: transmitting configuration information to a second node. The configuration information is related to sidelink data transmission on a plurality of carriers between the second node and at least one third node and comprises one or more rules related to carrier aggregation for the sidelink data transmission. The one or more rules comprise information related to a reliability level associated with the sidelink data transmission.

In a further embodiment, a first communication apparatus comprising a processor, a memory and a wireless interface is disclosed. The memory stores instructions that, when executed, cause the processor to: obtain configuration information related to sidelink data transmission between the first communication apparatus and at least one second communication apparatus, wherein the configuration information comprises one or more rules related to carrier aggregation for the sidelink data transmission, wherein the one or more rules comprise information related to a reliability level associated with the sidelink data transmission; and transmit the sidelink data to the at least one second communication apparatus on a plurality of carriers based on the configuration information.

In yet another embodiment, a first communication apparatus comprising a processor, a memory and a wireless interface is disclosed. The memory stores instructions that, when executed, cause the processor to: transmit configuration information to a second communication apparatus. The configuration information is related to sidelink data transmission on a plurality of carriers between the second communication apparatus and at least one third communication apparatus and comprises one or more rules related to carrier aggregation for the sidelink data transmission. The one or more rules comprise information related to a reliability level associated with the sidelink data transmission.

In still another embodiment, a non-transitory computer-readable medium having computer-executable instructions stored thereon is disclosed. The computer-executable instructions, when executed by a processor of a first node, causing the processor to implement a method comprising: obtaining configuration information related to sidelink data transmission between the first node and at least one second node, wherein the configuration information comprises one or more rules related to carrier aggregation for the sidelink data transmission, wherein the one or more rules comprise information related to a reliability level associated with the sidelink data transmission; and transmitting the sidelink data to the at least one second node on a plurality of carriers based on the configuration information.

In a further embodiment, a non-transitory computer-readable medium having computer-executable instructions stored thereon is disclosed. The computer-executable instructions, when executed by a processor of a first node, causing the processor to implement a method comprising: transmitting configuration information to a second node. The configuration information is related to sidelink data transmission on a plurality of carriers between the second node and at least one third node and comprises one or more rules related to carrier aggregation for the sidelink data transmission. The one or more rules comprise information related to a reliability level associated with the sidelink data transmission.

In a different embodiment, a communication node configured to carry out a disclosed method in some embodiment is disclosed.

In yet another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

In order to support eV2X services, PC5 Carrier Aggregation (CA) is proposed to achieve high reliability and high data rate. CA denotes that two or more Component Carriers (CCs) are aggregated in order to support wider transmission bandwidths. When it comes to PC5 CA, it means that vehicle UE may simultaneously perform sidelink reception or transmission on one or multiple PC5 CCs. But there has been no existing effective solution to realize data split and/or data duplication based on PC5 CA.

The present disclosure discloses systems and methods for configuring, activating, and deactivating PC5 CA for the purpose of data split or data duplication. In addition, the present disclosure discloses a method of sidelink user plane setup and maintenance to facilitate the data split or data duplication of PC5 CA. Through the high-bandwidth transmission by aggregating multiple CCs, the high data rate or high reliability may be achieved.

Figure 1A:
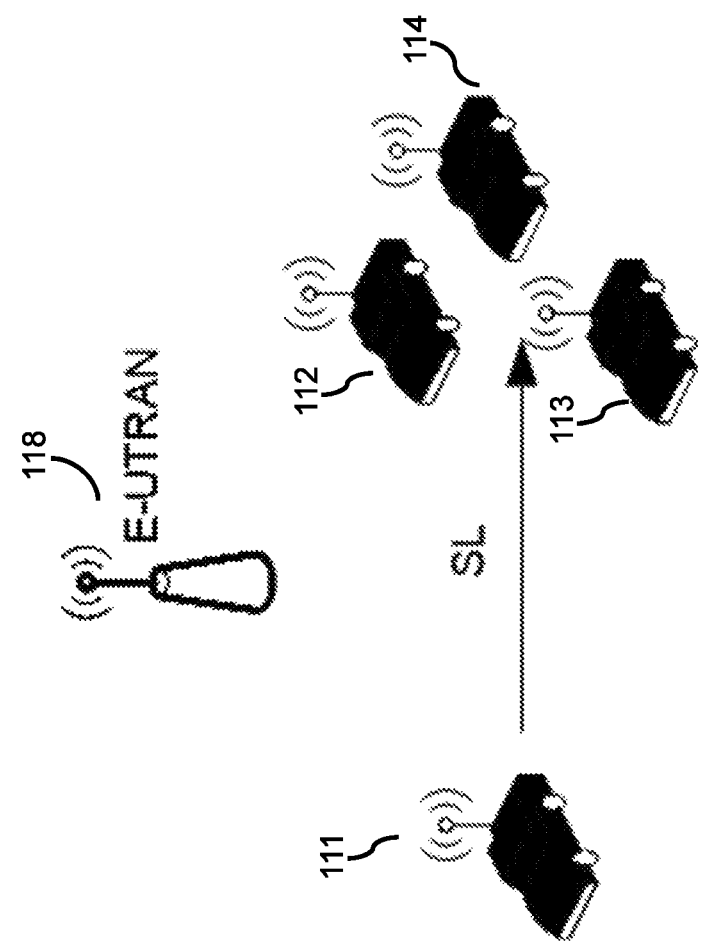
FIGS. 1A-1D illustrate different exemplary V2X communication networks in which techniques disclosed herein may be implemented, in accordance with an embodiment of the present disclosure.

FIGS. 1A-1D illustrate different exemplary V2X communication networks in which techniques disclosed herein may be implemented, in accordance with an embodiment of the present disclosure. FIG. 1A shows a communication network 110 that supports PC5-based SL (sidelink) V2X communication. As shown in FIG. 1A, a UE 111 sends a V2X message to one or more UEs 112, 113, 114 via the sidelink PC5 interface. The sidelink data do not go through the base station 118 here.

Figure 1B:
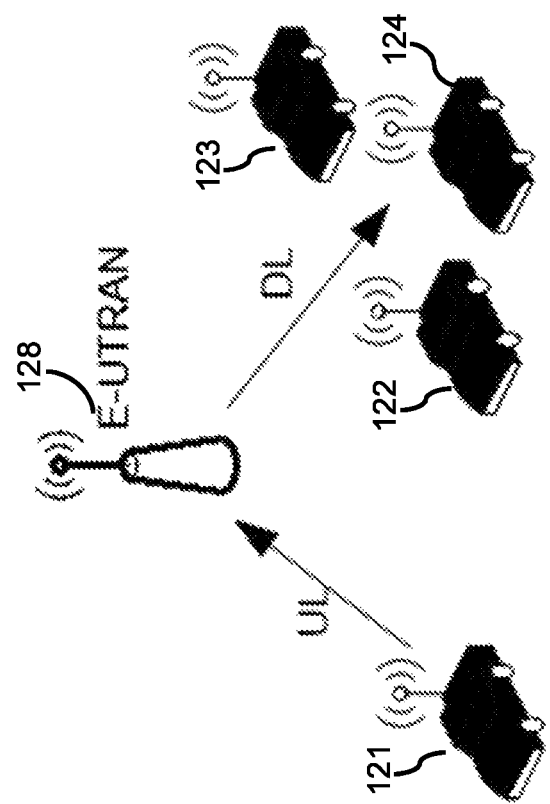

FIG. 1B shows a communication network 120 that supports V2X communication via Uu (the interface between a base station and a UE). As shown in FIG. 1B, a UE 121 forwards the V2X message to the E-UTRAN 128 (base station) via unlink transmission, and the E-UTRAN 128 broadcasts the V2X message to a plurality of UEs 122, 123, 124 in the local area via downlink transmission.

Figure 1C:
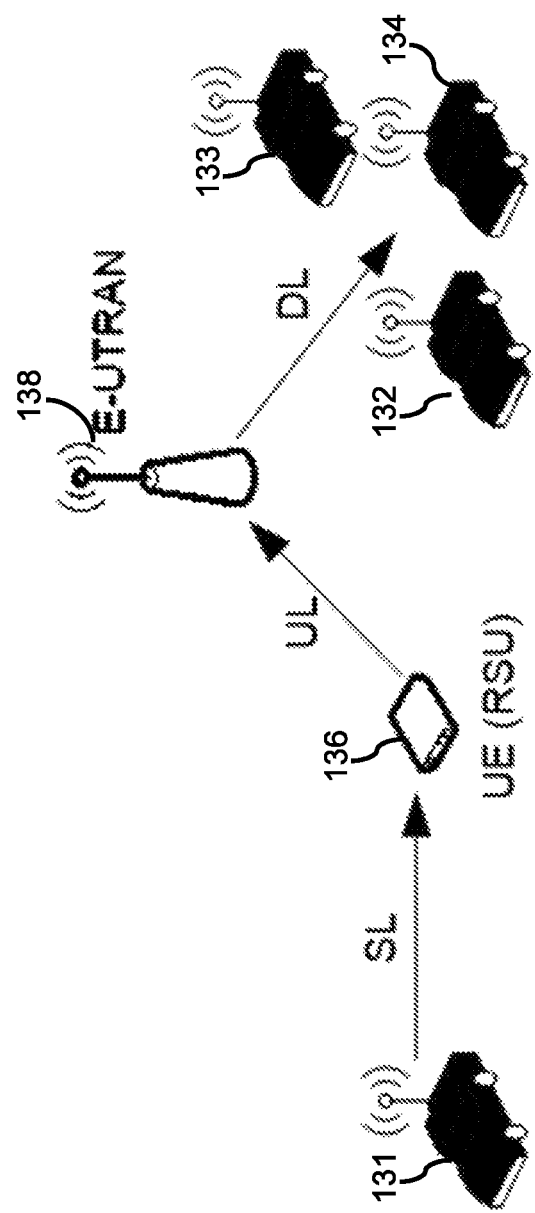

FIG. 1C shows a communication network 130 that supports V2V communication using the E-UTRAN 138 and PC5 interfaces. As shown in FIG. 1C, a UE 131 sends a V2X message to the UE type Road Side Unit (RSU) 136 via the PC5 interface. The UE type RSU 136 receives the V2X message from the PC5 interface and transmits the V2X message to the base station 138. The base station 138 broadcasts the V2X messages received from the UE type RSU 136 to multiple UEs 132, 133, 134 in the local area via downlink transmission.

Figure 1D:
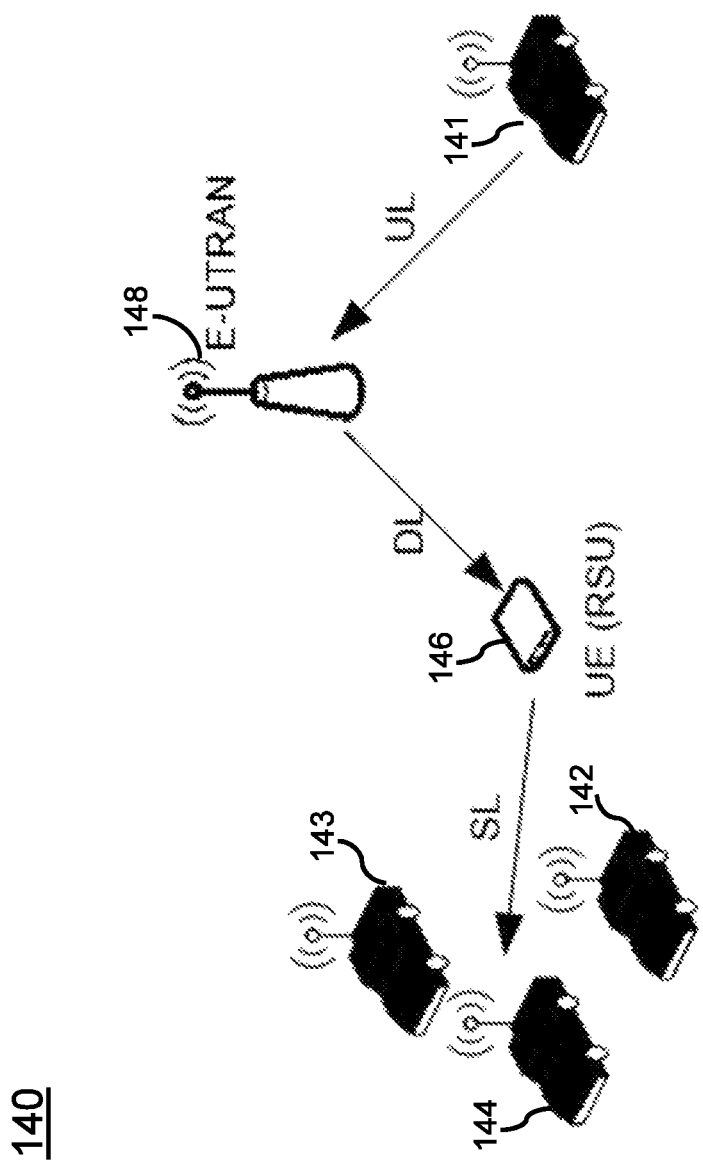

FIG. 1D shows a communication network 140 that supports V2V communication using the E-UTRAN 148 and PC5 interfaces. As shown in FIG. 1D, a UE 141 forwards the V2X message to the radio access network or the base station 148, which transmits the V2X message to one or more UE type RSUs 146. The UE type RSU 146 then sends the V2X message over the PC5 interface to one or more UEs 142, 143, 144 in the local area.

V2X sidelink communication includes two transmission modes: mode 3 based on the base station scheduling resource allocation and mode 4 based on the UE autonomous resource selection. In the mode 3, the UE transmits the control information and data at the designated resource according to the scheduling of the base station. In mode 4, the UE self-selects resource to transmit the control information and data based on resource sensing of the transmission resource pool. The systems and methods disclosed in the present disclosure can be used not only in a V2X network but also in a device-to-device (D2D) network. When they are used in D2D, mode 3 is replaced by mode 1, which is also BS scheduled sidelink resource allocation scheme; and mode 4 is replaced by mode 2, which is also UE autonomous resource selection scheme.

The methods disclosed in the present disclosure can be implemented in a cellular communication network, which includes one or more cells. Each cell may include at least one BS operating at its allocated bandwidth to provide adequate radio coverage to its intended users, e.g. UE devices. In various embodiments, a BS in the present disclosure can include, or be implemented as, a next Generation Node B (gNB), an E-UTRAN Node B (eNB), a Transmission/Reception Point (TRP), an Access Point (AP), etc. A BS and a UE device can communicate with each other via a communication link, e.g., via a downlink radio frame from the BS to the UE or via an uplink radio frame from the UE to the BS. Two UEs can communicate with each other via a sidelink. A BS and a UE may be described herein as non-limiting examples of "communication nodes," or "nodes" generally, which can practice the methods disclosed herein and may be capable of wireless and/or wired communications, in accordance with various embodiments of the present disclosure.

A motivation for PC5 duplication is to improve reliability of sidelink data transmission and/or reception. The V2X sidelink data transmission on one carrier does not support automatic repeat request (ARQ). For hybrid ARQ (HARD), it only supports the media access control (MAC) Protocol Data Unit (PDU) retransmissions in a configurable numbers without acknowledgement (ACK) or negative acknowledgement (NACK). The time-diversity has been explored by means of V2X MAC PDU retransmission on a specific carrier. On the other hand, the frequency-diversity may be utilized through the PC5 data duplication. That is, the V2X sidelink transmission UE may transmit duplicates of sidelink data on multiple carriers. The V2X sidelink receiving UE may detect the duplication and discard the duplicated sidelink data. In this manner, more retransmissions over multiple carriers are achieved and the reliability of V2X sidelink transmission is improved.

For the data split, the parallel transmission of different data packets on multiple carriers may be considered. Since the radio resources of multiple carriers could be used for a transmission (Tx) UE, the data rate of V2X sidelink transmission can be improved. On the other hand, to support the data split, simultaneous reception over multiple carriers may be supported from the perspective of the receiving (Rx) UE.

Figure 2A:
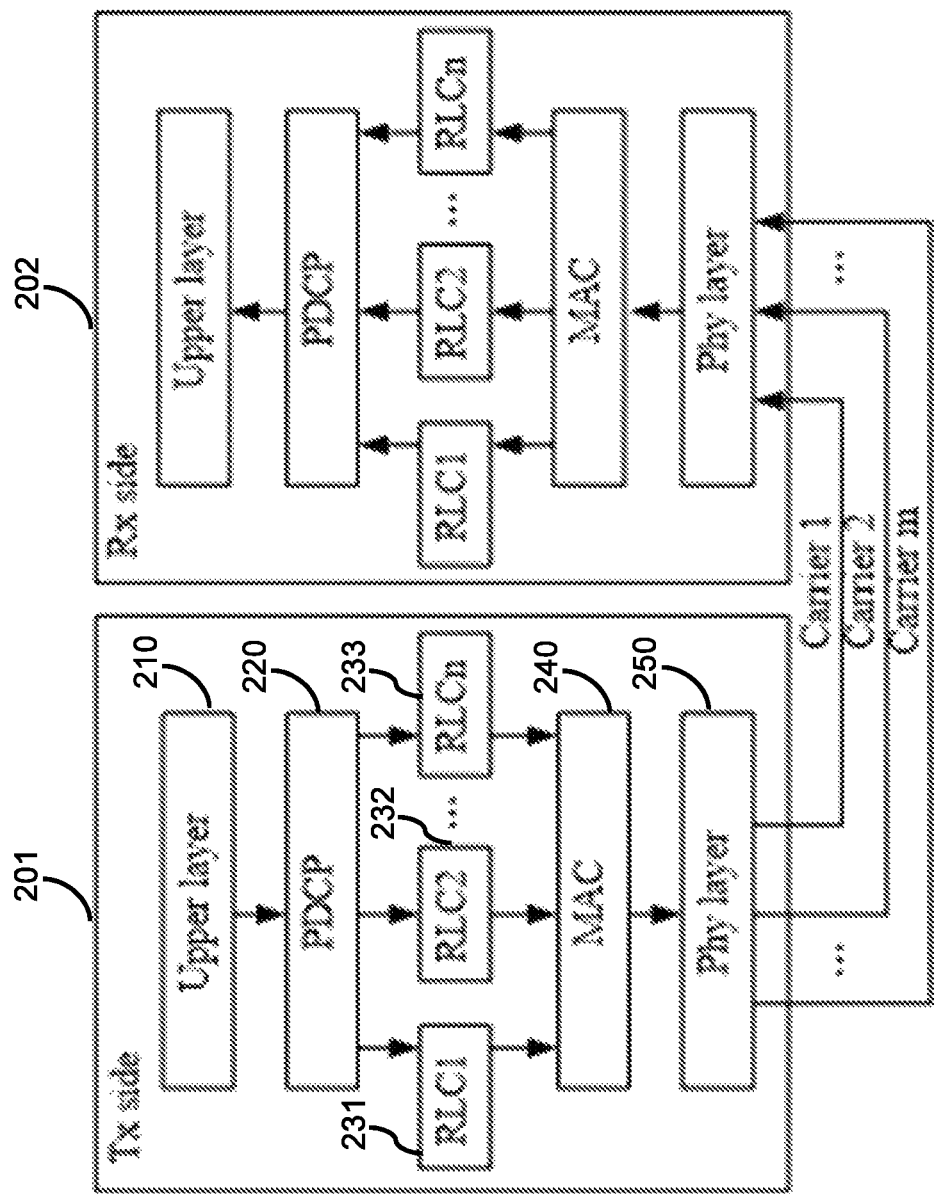
FIG. 2A illustrates an exemplary carrier aggregation scheme, in accordance with an embodiment of the present disclosure.

There are two exemplary options for PC5 data duplication/data split (carrier aggregation). The first option is packet data convergence protocol (PDCP) data duplication/data spit; and the second option is MAC data duplication/data split. The first option is illustrated in FIG. 2A, according to one embodiment. As shown in FIG. 2A, for a given data radio bearer (DRB) or signaling radio bearer (SRB) that supports data duplication or data split, there are: one PDCP entity 220, two or more radio link control (RLC) entities 231, 232, 233, and two or more logical channels associated with it. For the MAC entity 240, one or multiple MAC entities may be established, depending on whether PC5 CA or PC5 DC is used. When data packet arrives at the PDCP layer 220 from upper layer 210 at the Tx UE side 201, the PDCP entity 220 performs the encryption and header compression. For the radio bearer (RB) that supports PDCP duplication, the PDCP entity 220 duplicates the PDCP PDU and delivers the original and duplicate to two or more different RLC entities 231, 232, 233. For the PDCP data split, the PDCP entity 220 may deliver the PDCP PDUs to different RLC entities 231, 232, 233 according to pre-configured data split ratio or data split rules. The MAC entity 240 then perform the scheduling, multiplexing and assembly independently for different carriers and then deliver this MAC PDU to PHY layer 250 which transmits over different carriers.

Similarly, at the Rx UE side 202, multiple Rx RLC entities and logical channels can be established. When RLC unacknowledged mode (UM) is configured, each Rx RLC entity may reorder the RLC PDU and discard the duplicate packet. For the PDCP Rx entity associated with RB support PDCP duplication, since it receives the duplicate PDCP PDU from multiple Rx RLC entities, it needs to perform the reordering and duplicate discard again. For the PDCP Rx entity associated with RB support PDCP split, since it receives different PDCP PDUs from multiple Rx RLC entities, it also needs to perform the reordering again. Due to the re-ordering of both RLC and PDCP layer, the end-to-end latency of V2X data may be increased.

Figure 2B:
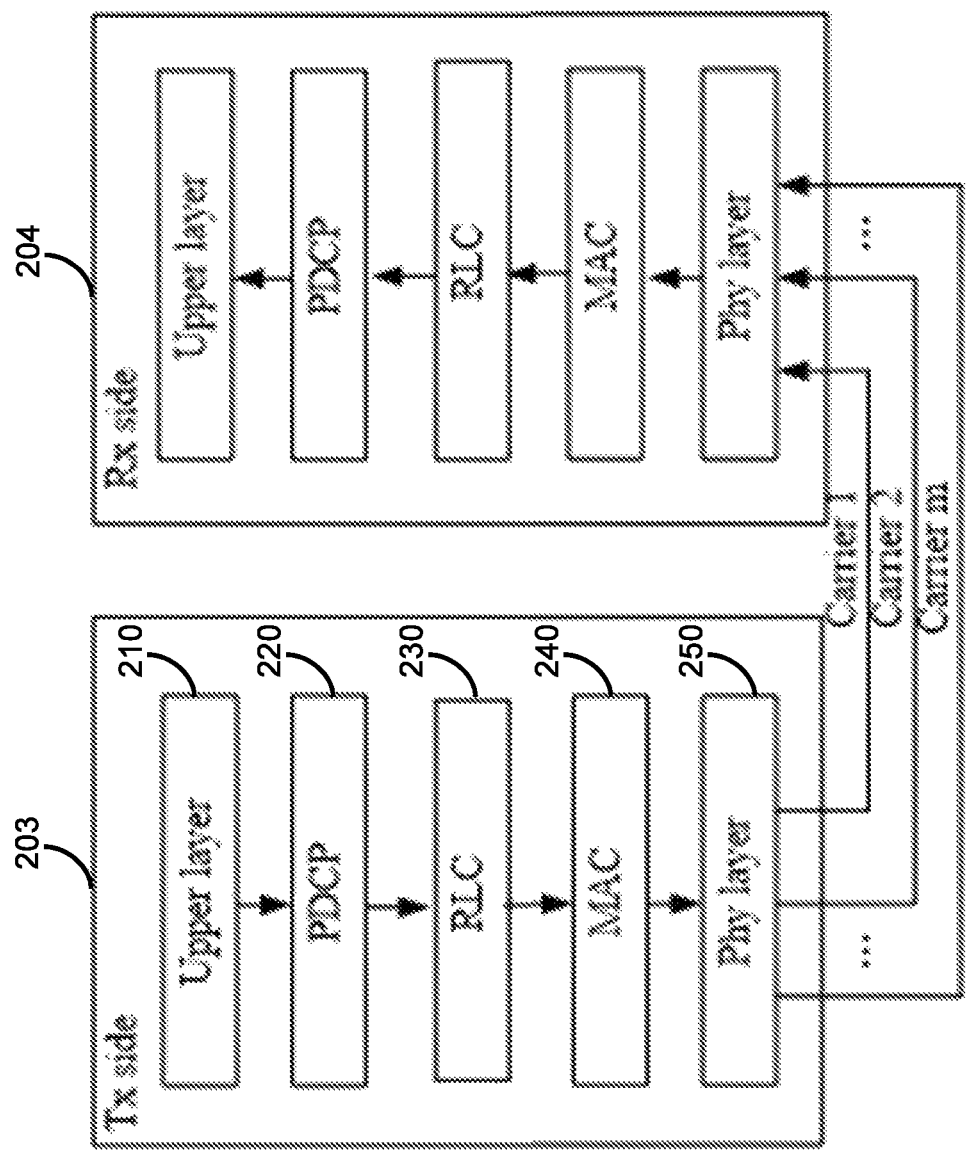
FIG. 2B illustrates another exemplary carrier aggregation scheme, in accordance with an embodiment of the present disclosure.

FIG. 2B illustrates another exemplary carrier aggregation scheme, i.e. MAC data duplication/data split, in accordance with an embodiment of the present disclosure. In this option, there is: one PDCP entity 220, one RLC entity 230, and one logical channel associated with one RB, no matter the RB is configured with data duplication or data split. When data packet arrives at the PDCP layer 220 from upper layer 210 at the Tx UE side 203, the PDCP entity 220 performs the encryption and header compression, and then delivers the PDCP PDU to RLC entity 230.

In order to support the MAC data duplication, the MAC entity 240 may be configured with SL grant of the same TB size for different carriers. In this manner, the same MAC PDU can be transmitted over different carriers. On the other hand, not all the data packet requires data duplication. When RB1 requires data duplication whereas RB2 and RB3 do not, the MAC entity 240 can schedule the RB1's data packet separately from RB2 and RB3, and then perform the duplicated MAC PDU transmission which only contains the data packets from RB1.

For the MAC data split, the MAC entity 240 may be able to schedule the data packet buffered in the logical channel or RLC entity 230 associated with RB that supports data split according to the pre-configured data split ratio or data split rules and transmit the split data packets on different carriers.

On the other hand, for the Rx side 204, since there is only one Rx RLC entity, the RLC SDU can be delivered to the same RLC entity for re-ordering and duplicate discard. That is, the re-ordering and duplicate discard in Rx PDCP entity is no longer necessary.

Figure 3:
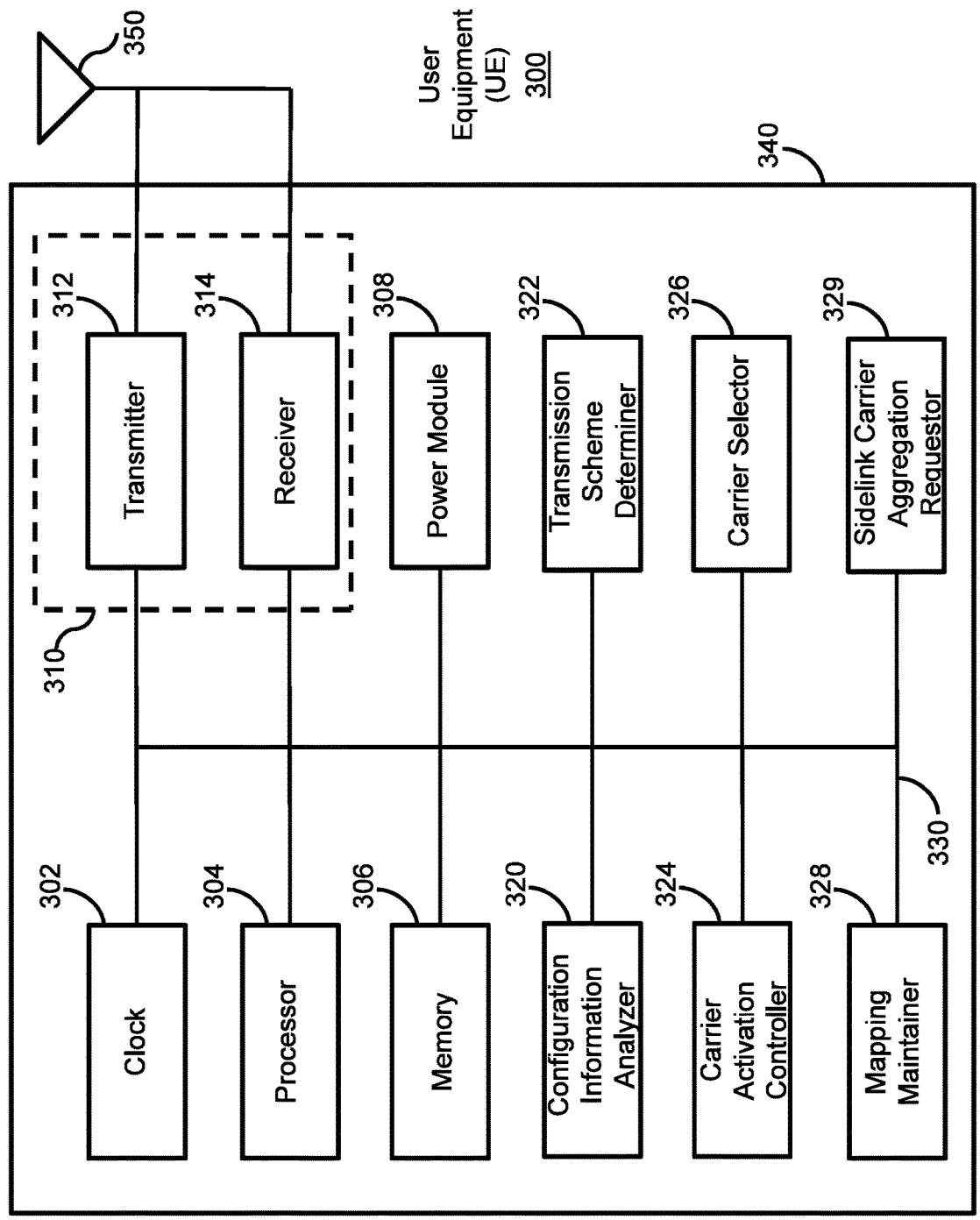
FIG. 3 illustrates a block diagram of a user equipment (UE), in accordance with some embodiments of the present disclosure.

FIG. 3 illustrates a block diagram of a user equipment (UE) 300, in accordance with some embodiments of the present disclosure. The UE 300 is an example of a device that can be configured to implement the various methods described herein. As shown in FIG. 3, the UE 300 includes a housing 340 containing a system clock 302, a processor 304, a memory 306, a transceiver 310 comprising a transmitter 312 and receiver 314, a power module 308, a sidelink configuration information analyzer 320, a transmission scheme determiner 322, a carrier activation controller 324, a carrier selector 326, a mapping maintainer 328, and a sidelink carrier aggregation requestor 329.

In this embodiment, the system clock 302 provides the timing signals to the processor 304 for controlling the timing of all operations of the UE 300. The processor 304 controls the general operation of the UE 300 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 306, which can include both read-only memory (ROM) and random access memory (RAM), can provide instructions and data to the processor 304. A portion of the memory 306 can also include non-volatile random access memory (NVRAM). The processor 304 typically performs logical and arithmetic operations based on program instructions stored within the memory 306. The instructions (a.k.a., software) stored in the memory 306 can be executed by the processor 304 to perform the methods described herein. The processor 304 and memory 306 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 310, which includes the transmitter 312 and receiver 314, allows the UE 300 to transmit and receive data to and from a remote device (e.g., the BS or another UE). An antenna 350 is typically attached to the housing 340 and electrically coupled to the transceiver 310. In various embodiments, the UE 300 includes (not shown) multiple transmitters, multiple receivers, multiple transceivers, and/or multiple antennas. The transmitter 312 can be configured to wirelessly transmit packets having different packet types or functions, such packets being generated by the processor 304. Similarly, the receiver 314 is configured to receive packets having different packet types or functions, and the processor 304 is configured to process packets of a plurality of different packet types. For example, the processor 304 can be configured to determine the type of packet and to process the packet and/or fields of the packet accordingly.

In a sidelink communication, a transmission UE transmits data to a receiving UE via the sidelink between them directly. In accordance with various embodiments, the UE 300 may serve as either a transmission UE or a receiving UE in a sidelink communication.

When the UE 300 serves as a transmission UE, the sidelink configuration information analyzer 320 may obtain and analyze configuration information related to sidelink data transmission between the UE 300 and a receiving UE on a plurality of carriers. The configuration information may be obtained based on at least one of: a pre-configuration and a configuration by a base station. In one embodiment, the sidelink configuration information analyzer 320 may broadcast at least part of the configuration information to the receiving UE. In another embodiment, the sidelink configuration information analyzer 320 may transmit at least part of the configuration information to the receiving UE via unicast, and receive a sidelink configuration response from the receiving UE. The sidelink configuration response indicates whether the receiving UE accepts a sidelink transmission scheme (e.g. data duplication or data split) proposed by the UE 300.

In one embodiment, the configuration information comprises one or more rules related to carrier aggregation for the sidelink data transmission. For example, for data duplication, the one or more rules are related to at least one of: a priority level of data to be transmitted; a reliability level of the data to be transmitted; a Quality of Service (QoS) class identifier of the data to be transmitted; and a service type of the data to be transmitted. For data split, the one or more rules are related to at least one of: a priority level of data to be transmitted; a threshold of data rate of the data to be transmitted; a service type of the data to be transmitted; a sidelink data split threshold for determining when data split is needed; a data split ratio; and a sidelink data aggregate threshold for determining when data split is no longer needed. The data split ratio may indicate the ratio of data to be transmitted in each leg or carrier.

The transmission scheme determiner 322 in this example may determine a sidelink transmission scheme based on the configuration information obtained by the sidelink configuration information analyzer 320. The sidelink transmission scheme may be related to either data duplication or data split on sidelink transmissions of the UE 300. When the UE 300 autonomously decides to perform data duplication or data split on sidelink transmission, the transmission scheme determiner 322 may transmit, via the transmitter 312, an indication to the base station for informing the base station about the data duplication or data split sidelink transmission on the plurality of carriers. The UE 300 may transmit, via the transmitter 312, sidelink data to the receiving UE, according to the data duplication or data split scheme, with or without processing the sidelink data by the processor 304.

The carrier selector 326 in this example selects a plurality of carriers for the sidelink data transmission according to the sidelink transmission scheme. In one embodiment, the carrier selector 326 selects the plurality of carriers based on at least one of: a capability of the UE 300, a service type of the data to be transmitted, a channel occupation status of each of a plurality of sidelink logical channels, and a channel quality of each of the plurality of sidelink logical channels. When a dynamic parameter like channel occupation status and channel quality changes, the carrier selector 326 may re-select an updated plurality of carriers for the sidelink data transmission according to the sidelink transmission scheme.

The carrier activation controller 324 in this example may perform an activation of the sidelink transmission scheme on a radio bearer, a logical channel, or a carrier when a condition is met on the carrier; and perform a deactivation of the sidelink transmission scheme on a radio bearer, a logical channel, or a carrier when the condition is not met on the carrier. In one embodiment, the condition on the carrier is related to at least one of: a channel busy ratio threshold; a channel quality threshold of the carrier; and a deactivation timer. The carrier activation controller 324 may transmit an activation indication to the receiving UE to indicate an activation of the sidelink transmission scheme when the activation is performed; and transmit a deactivation indication to the receiving UE to indicate a deactivation of the sidelink transmission scheme when the deactivation is performed.

The mapping maintainer 328 in this example can determine and maintain various mappings related to the data duplication or data split. The mapping maintainer 328 may determine a mapping between the plurality of carriers and a plurality of sidelink logical channels or radio bearers; and a mapping between a sidelink radio bearer identifier and a plurality of sidelink logical channels. The UE 300 can transmit sidelink data based on these mappings.

As the carriers may be updated or re-selected by the carrier selector 326 according to dynamic channel status and quality, the corresponding mappings determined at the mapping maintainer 328 are also updated accordingly and maintained by the mapping maintainer 328. The mapping maintainer 328 may transmit, via the transmitter 312, these mappings to the receiving UE via sidelink dedicated signaling.

In one embodiment, the mapping maintainer 328 may determine these mappings by identifying these mapping included in the configuration information sent by the base station. In this case, these mappings may be configured and re-configured by the base station via at least one of: radio resource control (RRC) dedicated signaling and a MAC control element (CE).

In another embodiment, the mapping maintainer 328 may determine these mappings either by generating them according to the sidelink transmission scheme determined by the transmission scheme determiner 322. When the UE 300 autonomously decides to perform data duplication or data split on sidelink transmission, the mapping maintainer 328 may transmit, via the transmitter 312, these mappings to the base station for informing the base station about the mappings.

The sidelink carrier aggregation requestor 329 in this example is an optional component of the UE 300. In one embodiment, the sidelink carrier aggregation requestor 329 can transmit a sidelink configuration request to a base station. The base station may transmit the configuration information to the UE 300 in response to the sidelink configuration request, after deciding to support the data duplication or data split sidelink transmission of the UE 300 on the plurality of carriers.

When the UE 300 serves as a receiving UE, the sidelink configuration information analyzer 320 can receive, via the receiver 314, the configuration information either from the transmission UE or from the base station serving both of the two UEs. In one embodiment, the sidelink configuration information analyzer 320 of a receiving UE receives the configuration information from the transmission UE via unicast; and transmits a sidelink configuration response to the transmission UE. The sidelink configuration response indicates whether the receiving UE accepts a sidelink data transmission via unicast on the plurality of carriers.

The transmission scheme determiner 322 of a receiving UE may determine a sidelink transmission scheme for the sidelink data transmission from the transmission UE, based on the configuration information. The carrier activation controller 324 of a receiving UE may receive from the transmission UE, either an activation indication indicating an activation of the sidelink transmission scheme on a radio bearer, a logical channel, or a carrier; or a deactivation indication indicating a deactivation of the sidelink transmission scheme on a radio bearer, a logical channel, or a carrier. The mapping maintainer 328 of a receiving UE may obtain mappings related to the data duplication or data split sidelink transmission (e.g. a mapping between a sidelink radio bearer identifier and a plurality of sidelink logical channels) based on at least one of: a new MAC sub-header containing the sidelink radio bearer identifier from the transmission UE; a new MAC control element (CE) from the transmission UE; sidelink signaling from the transmission UE; and the configuration information obtained by the sidelink configuration information analyzer 320. Any one of the new MAC sub-header, the new MAC CE, and the sidelink signaling may contain an indication of data duplication or data split, and/or a service type.

The UE 300, when serving as a receiving UE, receives, via the receiver 314, sidelink data from the transmission UE based on these mappings, according to the data duplication or data split scheme.

The power module 308 can include a power source such as one or more batteries, and a power regulator, to provide regulated power to each of the above-described modules in FIG. 3. In some embodiments, if the UE 300 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the UE 300 can be operatively coupled to one another using any suitable techniques and mediums.

Although a number of separate modules or components are illustrated in FIG. 3, persons of ordinary skill in the art will understand that one or more of the modules can be combined or commonly implemented. For example, the processor 304 can implement not only the functionality described above with respect to the processor 304, but also implement the functionality described above with respect to the sidelink configuration information analyzer 320. Conversely, each of the modules illustrated in FIG. 3 can be implemented using a plurality of separate components or elements.

Figure 4:
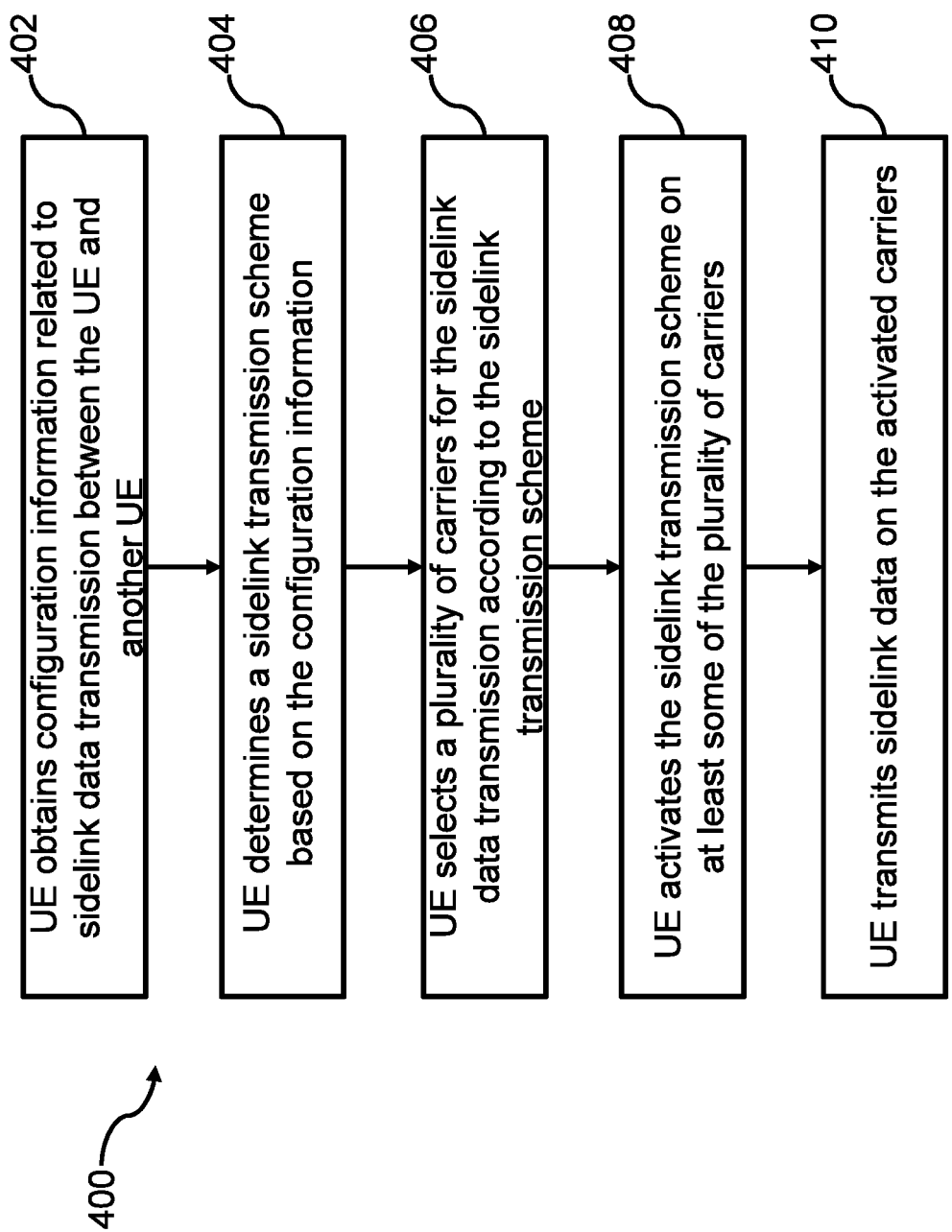
FIG. 4 illustrates a flow chart for a method performed by a UE for performing carrier aggregation in wireless sidelink communications, in accordance with some embodiments of the present disclosure.

FIG. 4 illustrates a flow chart for a method 400 performed by a UE, e.g. the UE 300 as shown in FIG. 3, for performing carrier aggregation in wireless sidelink communications, in accordance with some embodiments of the present disclosure. In this example, the UE 300 may serve as a transmission UE to transmit sidelink data according to a carrier aggregation scheme, e.g. data duplication or data split.

At operation 402, the UE obtains configuration information related to sidelink data transmission between the UE and another UE. At operation 404, the UE determines a sidelink transmission scheme based on the configuration information. At operation 406, the UE selects a plurality of carriers for the sidelink data transmission according to the sidelink transmission scheme. The UE activates, at operation 408, the sidelink transmission scheme on at least some of the plurality of carriers. At operation 410, the UE transmits sidelink data on the activated carriers.

Figure 5:
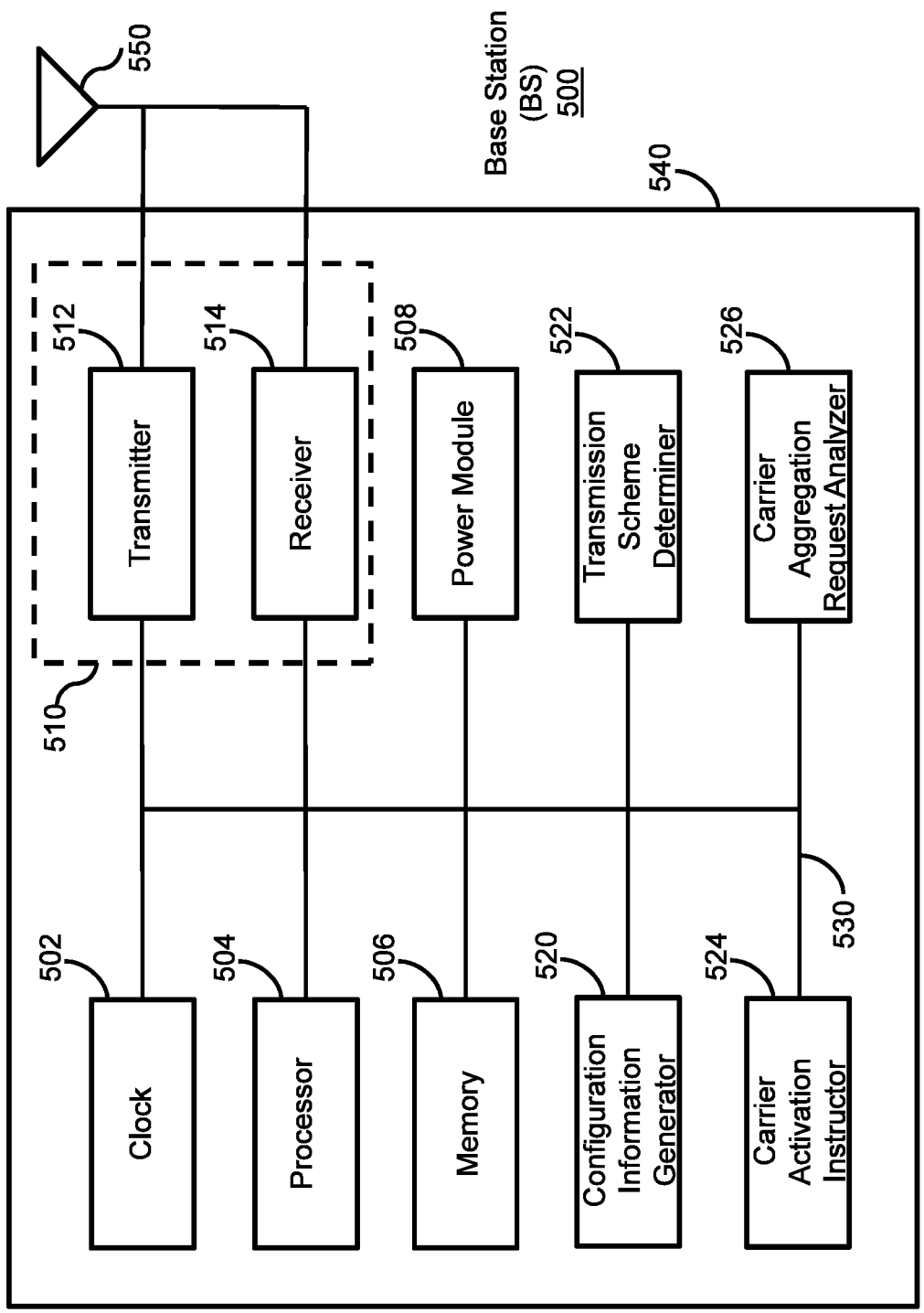
FIG. 5 illustrates a block diagram of a base station (BS), in accordance with some embodiments of the present disclosure.

FIG. 5 illustrates a block diagram of a base station (BS) 500, in accordance with some embodiments of the present disclosure. The BS 500 is an example of a device that can be configured to implement the various methods described herein. As shown in FIG. 5, the BS 500 includes a housing 540 containing a system clock 502, a processor 504, a memory 506, a transceiver 510 comprising a transmitter 512 and a receiver 514, a power module 508, a configuration information generator 520, a transmission scheme determiner 522, a carrier activation instructor 524, and a carrier aggregation request analyzer 526.

In this embodiment, the system clock 502, the processor 504, the memory 506, the transceiver 510 and the power module 508 work similarly to the system clock 302, the processor 304, the memory 306, the transceiver 310 and the power module 308 in the UE 300. An antenna 550 is typically attached to the housing 540 and electrically coupled to the transceiver 510.

The configuration information generator 520 may generate and transmit, via the transmitter 512, configuration information to a transmission UE. In one embodiment, the configuration information is related to sidelink data transmission on a plurality of carriers between the transmission UE and at least one receiving UE and comprises one or more rules related to carrier aggregation for the sidelink data transmission. In another embodiment, the configuration information indicates a decision of the BS 500 to support the sidelink data transmission on a plurality of carriers between the transmission UE and at least one receiving UE according to a sidelink transmission scheme. In one embodiment, the configuration information generator 520 also transmits, via the transmitter 512, the configuration information to the receiving UE.

In one embodiment, the transmission scheme determiner 522 in this example determines a sidelink transmission scheme and makes a decision to support the sidelink data transmission of the transmission UE on the plurality of carriers according to the sidelink transmission scheme. The sidelink transmission scheme is related to at least one of: a data duplication configuration and a data split configuration.

In another embodiment, when the transmission UE autonomously decides to perform data duplication or data split on sidelink transmission, the transmission scheme determiner 522 may receive, via the receiver 514, an indication from the transmission UE. The indication indicates that the transmission UE transmits sidelink data to the receiving UE on the plurality of carriers according to a sidelink transmission scheme. The transmission scheme determiner 522 may also receive, via the receiver 514, a mapping related to the carrier aggregation sidelink transmission from the transmission UE, e.g. a mapping between the plurality of carriers and a plurality of sidelink logical channels.

The carrier activation instructor 524 in this example may instruct the transmission UE to perform an activation of the sidelink transmission scheme on each of the plurality of carriers when a condition is met on the carrier, e.g. by sending a command that indicates which radio bearer, which logical channel, or which carrier on which the activation is to be performed. The carrier activation instructor 524 may then instruct the transmission UE to transmit sidelink data to the receiving UE on the activated carriers. The carrier activation instructor 524 may also instruct the transmission UE to perform a deactivation of the sidelink transmission scheme on a radio bearer, a logical channel, or a carrier when the condition is not met on the carrier, e.g. by sending another command. In one embodiment, the condition on the carrier is related to at least one of: a channel busy ratio threshold; a channel quality threshold of the carrier; and a deactivation timer.

The carrier aggregation request analyzer 526 in this example may receive a sidelink configuration request from the transmission UE. The configuration information generator 520 may transmit the configuration information to the transmission UE in response to the sidelink configuration request.

The various modules discussed above are coupled together by a bus system 530. The bus system 530 can include a data bus and, for example, a power bus, a control signal bus, and/or a status signal bus in addition to the data bus. It is understood that the modules of the BS 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 504 can implement not only the functionality described above with respect to the processor 504, but also implement the functionality described above with respect to the transmission scheme determiner 522. Conversely, each of the modules illustrated in FIG. 5 can be implemented using a plurality of separate components or elements.

Figure 6:
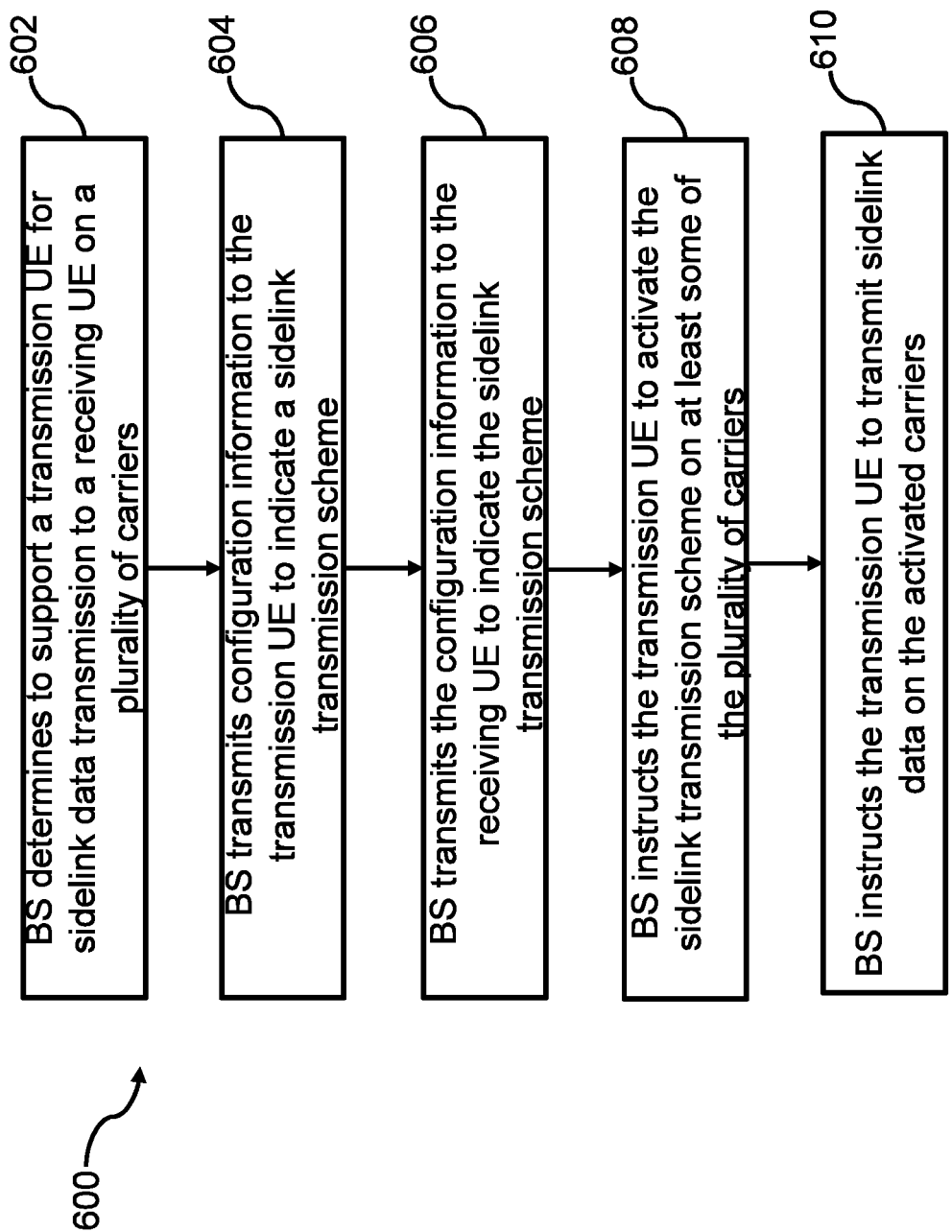
FIG. 6 illustrates a flow chart for a method performed by a BS for supporting carrier aggregation in wireless sidelink communications, in accordance with some embodiments of the present disclosure.

FIG. 6 illustrates a flow chart for a method 500 performed by a BS, e.g. the BS 500 in FIG. 5, for supporting carrier aggregation in wireless sidelink communications, in accordance with some embodiments of the present disclosure. At operation 602, a BS determines to support a transmission UE for sidelink data transmission to a receiving UE on a plurality of carriers. The BS transmits at operation 604 configuration information to the transmission UE to indicate a sidelink transmission scheme. The BS transmits at operation 606 the configuration information to the receiving UE to indicate the sidelink transmission scheme. At operation 608, the BS instructs the transmission UE to activate the sidelink transmission scheme on at least some of the plurality of carriers. The BS instructs at operation 610 the transmission UE to transmit sidelink data on the activated carriers, according to the sidelink transmission scheme, e.g. data duplication or data split.

Different embodiments of the present disclosure will now be described in detail hereinafter. It is noted that the features of the embodiments and examples in the present disclosure may be combined with each other in any manner without conflict.

Figure 7:
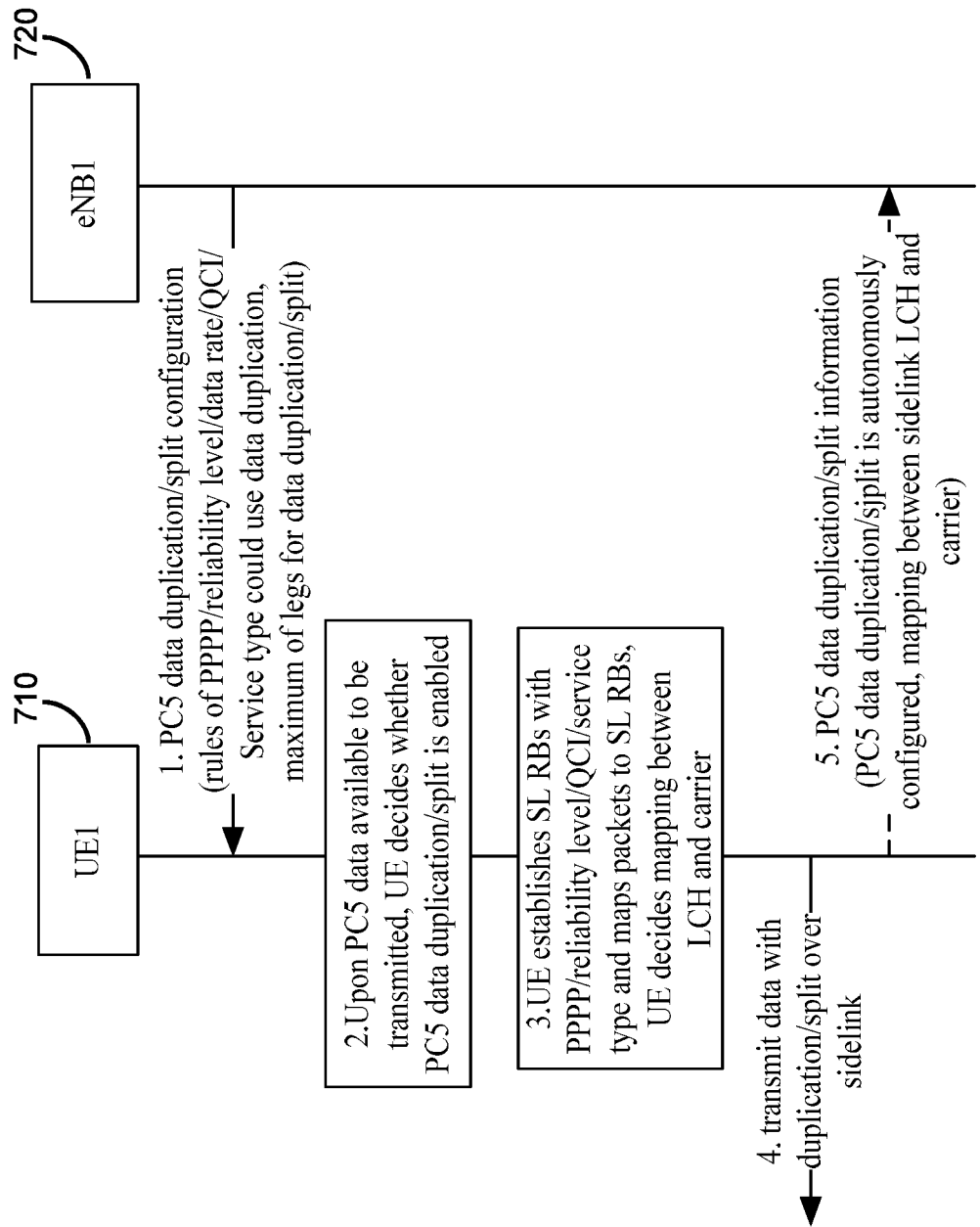
FIG. 7 illustrates an exemplary method for configuring carrier aggregation at a transmission UE, in accordance with some embodiments of the present disclosure.

In the present disclosure, both the UE autonomous PC5 data duplication/split configuration and BS controlled PC5 data duplication/split configuration are presented. For the UE autonomous PC5 data duplication/split configuration as shown in FIG. 7, the transmission (Tx) UE 710 could decide whether the data duplication/data split should be enabled based on the service request from upper layer. It could be an explicit indication from non-access stratum (NAS) layer or when access stratum (AS) layer receives a data packet with specific PPPP (ProSe Per-Packet Priority) or service type, QoS class identifier (QCI), reliability, or data rate requirement. The UE 710 autonomously determines whether the data duplication/data split should be enabled based on the PPPP and/or service type/QCI, and/or reliability/data rate requirement together with the data duplication/data split rules pre-configured or configured by BS 720 as shown in FIG. 7. PC5 data duplication/split rules preconfigured or configured by BS include the following rules.

First, when PPPP is associated with the reliability/data rate/service type/QCI, PPPP could be reused to indicate whether PC5 data duplication/data split should be enabled. For example, PPPP levels which could/should use PC5 data duplication/split can be preconfigured in UE or configured by BS.

Second, when the PPPP could not reflect the reliability level/data rate/service type/QCI, for the data packets to be transmitted, the upper layer may associate it with service type, reliability level, data rate, QCI or any combination of PPPP/reliability level/data rate/service type/QCI. Service type, reliability level, data rate, QCI or any combination of PPPP/reliability level/data rate/service type/QCI which could or should use PC5 data duplication/split can be preconfigured in UE or configured by BS.

Third, for PC5 data split, BS may configure a SL-data-split-threshold (in terms of bytes) and/or data split ratio (per UE). The parameter is used for the UE to determine whether data should be split and how many carriers should be involved. If PDCP split is considered, PDCP entity may use the SL-data-split-threshold to determine whether data is split to multiple RLC/LC entities to transmit. Alternatively, data split operation could be performed at MAC layer. The number of data packets that should be transmitted via which carrier could be determined by the MAC layer based on the SL-data-split-threshold/data split ratio. On the other hand, the BS may configure a SL-data-aggregate-threshold for the MAC layer to decide when the data split is not needed and thus fewer carriers will be used. Alternatively, the SL-data-split-threshold/data split ratio/SL-data-aggregate-threshold could be preconfigured.

Upon receiving data packets from upper layer, the UE decides which SL RB this packet should be delivered to. In the legacy V2X sidelink communication, the SL logical channel is established through UE implementation. For example, if the AS layer receives a data packet with a specific PPPP from upper layer and no logical channel with this PPPP has been established, the UE may establish a new logical channel. The BS has no idea how many SL logical channels that UE has set up. For Rx side, the Rx UE's SL logical channel is established when the MAC SDU corresponding to a new LCD is received within the scope of one source ID and target ID combination and no such logical channel has been set up. One PDCP entity and one RLC entity corresponding to the logical channel are also set up together with the logical channel at the Tx UE and Rx UE respectively.

If the PPPP could not reflect the service type/reliability level/data rate/QCI, the SL RB should be established not only based on PPPP, but also based on the service type/reliability level/data rate/QCI. It means that for packets with the same PPPP, it may be delivered to different RBs labelled with different service type/reliability level/QCI. In this way, the packets that require PC5 data duplication/split are delivered to separate SL RBs.

On the other hand, as discussed before, the PDCP data duplication and PDCP data split require the PC5 PDCP entity be associated with two or more RLC entities and logical channels. In order to support this, the PC5 RB/PDCP entity/RLC entity/logical channel setup/release/update procedure need to be enhanced.

The maximum number of RLC entities and logical channels to be established may be set as default value or preconfigured or configured by the BS. For example, the system may only allow the data duplication/data split of two legs. In this case, two RLC entities and logical channels shall be established for the PC5 RB with data duplication/data split. Alternatively, the maximum number of legs for data duplication/data split may be configured by the BS or per-configured. In this case, the number of RLC entities and logical channels shall not be larger than the maximum number of legs for data duplication/data split.

In addition, the actual number of RLC entities and logical channels to be established or the PC5 RB with data duplication/data split also depends on the available carriers. The available carriers may be selected based on the UE capability, service type, channel busy ratio and channel quality, etc. Based on the available carriers and the maximum number of legs for data duplication/data split, the UE may derive the number of RLC entities and logical channels to be established according to a minimum of (a) number of available carriers and (b) the maximum number of legs for data duplication/data split. After the carrier selection and determination of the number of RLC entities and logical channels, the UE may further decide the mapping between carriers and logical channels for the PC5 RB to support the data duplication/data split.

Since the PC5 RB may be associated with multiple logical channels for data duplication or data split, the PC5 RB ID may not be directly equal to the LCD. Tx UE should maintain a mapping between PC5 RB ID and multiple LCIDs.

When PDCP data duplication/split is expected, Tx UE further decides which carrier should be selected to perform the data duplication/split. The carrier selection could be based on the UE capability, service type, channel occupation status, channel quality, etc. After the carrier selection, the Tx UE decides the mapping between sidelink LCH and carrier.

Since the carrier selection for PC5 data duplication/split depends on the channel occupation stats and channel quality which are dynamic metrics, the carriers may be reselected when they vary and thus the mapping between LCH and carrier needs to be reconfigured. Therefore, Tx UE may maintain a mapping between LCH and carrier for PDCP data duplication/split, and may dynamically update it when carriers reselected. On the other hand, if PC5 data split operation is performed by MAC, only one PDCP entity, one RLC entity, one LCH is established for a SL RB. Thus, data of one SL RB may be duplicated or split to a set of carriers to be transmitted. In this case, a mapping between RB and carrier may be maintained in Tx UE for PC5 data duplication/split.

After the appropriate SL RB is established and the mapping between LCHs and carriers is decided, Tx UE may transmit PC5 data with duplication/split on corresponding carrier. Optionally, UE may inform BS that PC5 data duplication/split is autonomously configured and the mapping between sidelink LCH/RB and carrier.

Figure 8:
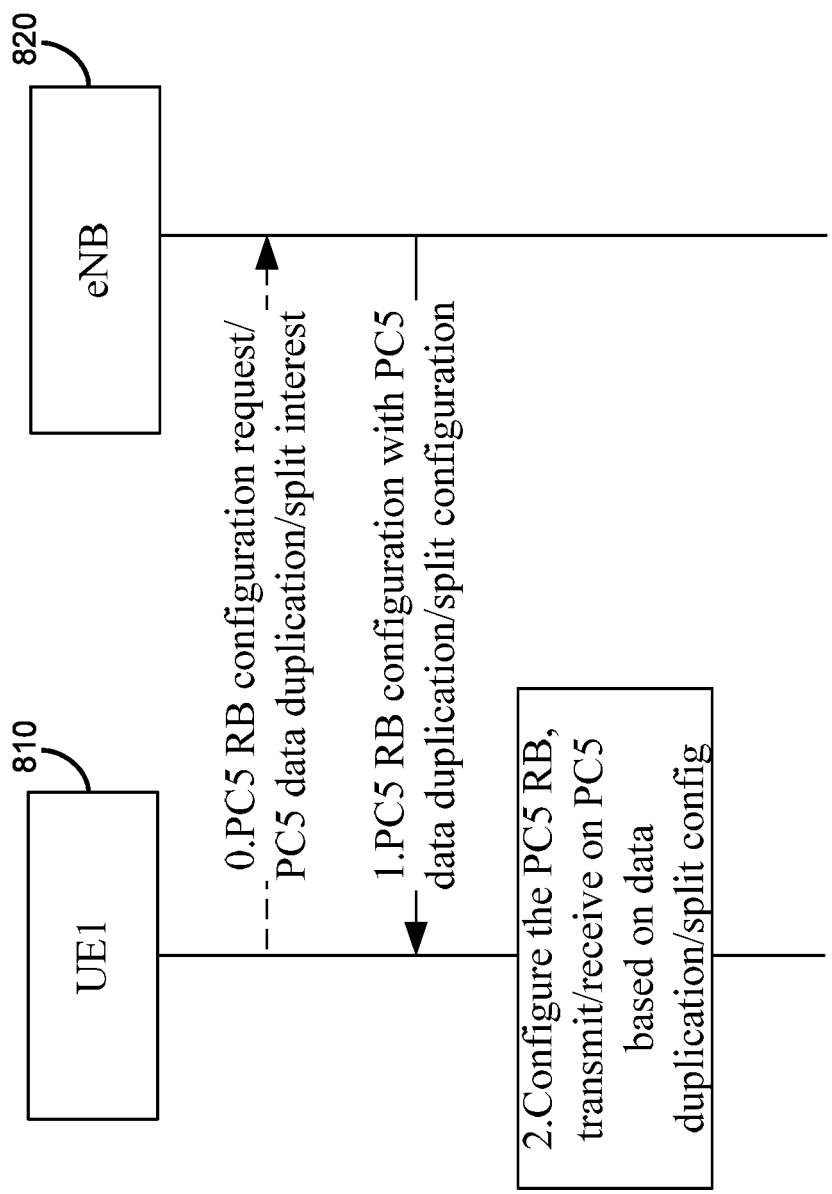
FIG. 8 illustrates another exemplary method for configuring carrier aggregation at a transmission UE, in accordance with some embodiments of the present disclosure.

For eV2X sidelink communication, the BS based SL RB configuration mechanism as well as BS configured UE-specific PC5 data duplication/split could be considered. In this case, as shown in FIG. 8, the BS 820 may configure the PC5 RB with appropriate PC5 QoS parameters to UE 810 together with PC5 data duplication/split configuration to UE 810.

The PC5 RB configuration information may include the PC5 RBs that should be set up/released/updated. For each PC5 RB, whether data duplication or data split should be supported is indicated. Optionally, the PC5 RB is used for SL transmission and or reception is also indicated. In addition, the PC5 RB may contain the PDCP, RLC and logical channel configurations. Multiple RLC and logical channel configurations may be included, corresponding to the multiple legs of a PC5 RB/PDCP.

In particular, PC5 RB configuration as well as PC5 data duplication/split configuration includes at least one of the following: SL RB identity, PC5 data split indication, PC5 data duplication indication, SL transmission indication, SL reception indication, PC5 QoS parameters, PDCP configuration, one or multiple RLC configurations, one or multiple LCH configurations, mapping between LCH and carrier, SL-data-split-threshold, data split ratio, SL-data-aggregate-threshold. PC5 QoS parameters include at least one of the following: PPPP, reliability level, service type, data rate, QCI. PC5 data duplication indication indicates whether the SL RB to enable/support PC5 data duplication. PC5 data split indication indicates whether the SL RB to enable/support PC5 data split. PDCP configuration includes at least one of: discard timer, PDCP sequence number (SN) length, header compression, t-reordering, data duplication primary path indication (in terms of LCID), and data split primary path indication (in terms of LCID). Data duplication/split primary path indication indicates which path/leg (RLC entity/LCH) to be used when PDCP data duplication/split is deactivated, which could be identified by LCID. RLC configuration includes at least one of: RLC acknowledge mode, RLC unacknowledge mode, RLC SN length, t-reordering, polling configuration. LCH configuration includes at least one of: LC identity, carrier index, LCG ID, priority, prioritized bit rate, bucket size duration. The SL-data-split-threshold/data split ratio/SL-data-aggregate-threshold may be configured per PC5 RB. It can be used by PDCP entity (when PDCP split is used) or MAC entity (when MAC split is used) as mentioned in UE autonomous PC5 data duplication/split. The mapping between LCH and carrier can be configured/modified/updated in PC5 RB configuration (via carrier index in LCH configuration) or by an independent signaling separated from PC5 RB configuration or by a MAC CE.

Before BS 820 configures PC5 RB configuration with PC5 data duplication/split configuration, UE1 810 may send PC5 RB configuration request/PC5 data duplication/split request to BS 820. Upon receiving the PC5 RB configuration with the data duplication/data split relevant info, the Tx UE 810 may configure the PC5 RB together with the PDCP entity, RLC entities and logical channels correspondingly, and then transmit on PC5 based on the data duplication/split configuration.

For the unicast V2X SL communication, the BS may have knowledge of the UE pairs that perform unicast V2X SL communication. In this case, as shown in FIG. 8 with no step 0, the BS 820 may also send the PC5 RB configuration with PC5 data duplication/split information to SL Rx UE 810. Besides the above mentioned information, the source UE ID corresponding to the Rx PC5 RB is also included. Upon receiving the PC5 RB configuration with the data duplication/data split relevant info, the Rx UE 810 may configure the PC5 RB together with the PDCP entity, RLC entities and logical channels correspondingly.

Figure 9:
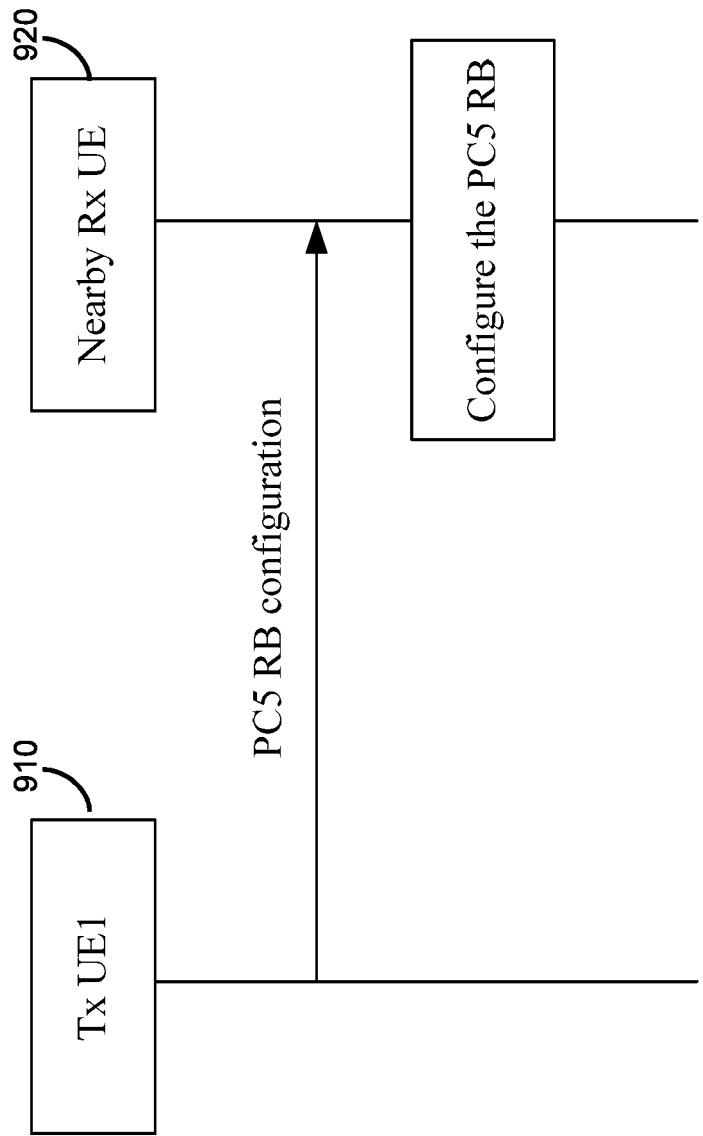
FIG. 9 illustrates an exemplary method for configuring carrier aggregation at a receiving UE, in accordance with some embodiments of the present disclosure.

In order to support the PDCP data duplication/data split, the Rx UE also needs to identify whether the data duplication/data split is enabled and which LCHs belong to the same PC5 RB/PDCP entity, and then configure the PC5 RB/PDCP entity/RLC entity/logical channel correspondingly. As shown in FIG. 9, Tx UE 910 may send its data duplication/data split relevant configuration to Rx UE 920 via broadcast or dedicated PC5 signaling. Upon receiving such info, the Rx UE 920 performs the PC5 RB/PDCP entity/RLC entity/logical channel setup/release/update. To be specific, the following solutions could be considered according to different embodiments.

In a first embodiment, Tx UE sends the PC5 MAC subheader that contains not only LCID but also RB ID. The MAC subheader may also contain the data duplication/data split indication and/or service type. Upon receiving such MAC subheader, the Rx UE could identify the MAC SDU belong to which logical channel and its corresponding PC5 RB, and then setup/release/update the PC5 RB, logical channel, RLC entity and PDCP entity for data duplication/data split purposes when necessary.

In a second embodiment, Tx UE sends the MAC CE which contains the mapping between LCID and RB ID. The MAC CE may also contain the data duplication/data split indication and or service type. Upon receiving such MAC CE, the Rx UE could identify the mapping between logical channels and PC5 RB, and then setup/release/update the PC5 RB, logical channel, RLC entity and PDCP entity for data duplication/data split purposes when necessary. For the unicast based Sidelink communication, the MAC CE only needs to be sent by the Tx UE once. For the broadcast or groupcast based sidelink communication, the MAC CE that contains the mapping between LCID and RB ID may be sent periodically to ensure that nearby Rx UEs (Rx UEs may change due to UE's mobility) could receive this information.

In a third embodiment, the mapping between LCID and RB ID is sent to Rx UE via PC5 RRC signaling. The PC5 RRC signaling may also contain the data duplication/data split indication and or service type. Upon receiving such PC5 RRC signaling, the Rx UE could identify the mapping between logical channels and PC5 RB, and then setup/release/update the PC5 RB, logical channel, RLC entity and PDCP entity for data duplication/data split purposes when necessary. For the unicast based sidelink communication, the PC5 RRC signaling only needs to be sent by the Tx UE once. For the broadcast or groupcast based sidelink communication, the PC5 RRC signaling that contains the mapping between LCID and RB ID may be sent periodically to ensure that nearby Rx UEs (Rx UEs may change due to UE's mobility) could receive this information.

It may also happen that only one RLC entity and logical channel are established when the PC5 RB that supports data duplication/data split is configured to set up. The establishment of additional RLC entities and logical channels may be triggered during the PC5 data duplication/PC5 data split activation and deactivation. On the other hand, for the MAC data duplication/data split, only one PDCP entity, one RLC entity and one logical channel is established for one PC5 RB.

In one embodiment, if the PC5 RB that supports data duplication/data split is configured to be set up, one PDCP entity, two or more RLC entities and two or more logical channels may be set up. But only one RLC entity and logical channel is used initially until the data duplication/data split is activated by UE or BS.

The data duplication/data split activation could be based on the emergence of data flow that requires high reliability/data rate. If the data duplication is activated at Tx UE, the PDCP entity may start to deliver the data packet duplicates to the additional RLC entity/logical channel. On the other hand, if no data flow that requires high reliability/data rate or some of the carriers overloaded, the data duplication/data split on several carriers may be deactivated. If the data duplication/data split is deactivated for several concerned carriers, the RLC entity/logical channels associated with the deactivated carriers may be reset, and other RLC entity/logical channels are still active. For the Tx UE, the data packet remained in the deactivated RLC entity/logical channel could be discarded. For the Rx UE, the assembled RLC SDU remained in the deactivated RLC entities could be delivered to the PDCP entity and then reset. In addition, the Rx PDCP entity's reordering and duplicate discard function could be disabled for the PC5 RB configured with data duplication if only one Rx RLC entity/logical channel is active.

The activation/deactivation could be initiated by BS or Tx UE. Different embodiments for the potential activation/deactivation implementation are to be discussed below.

Figure 10:
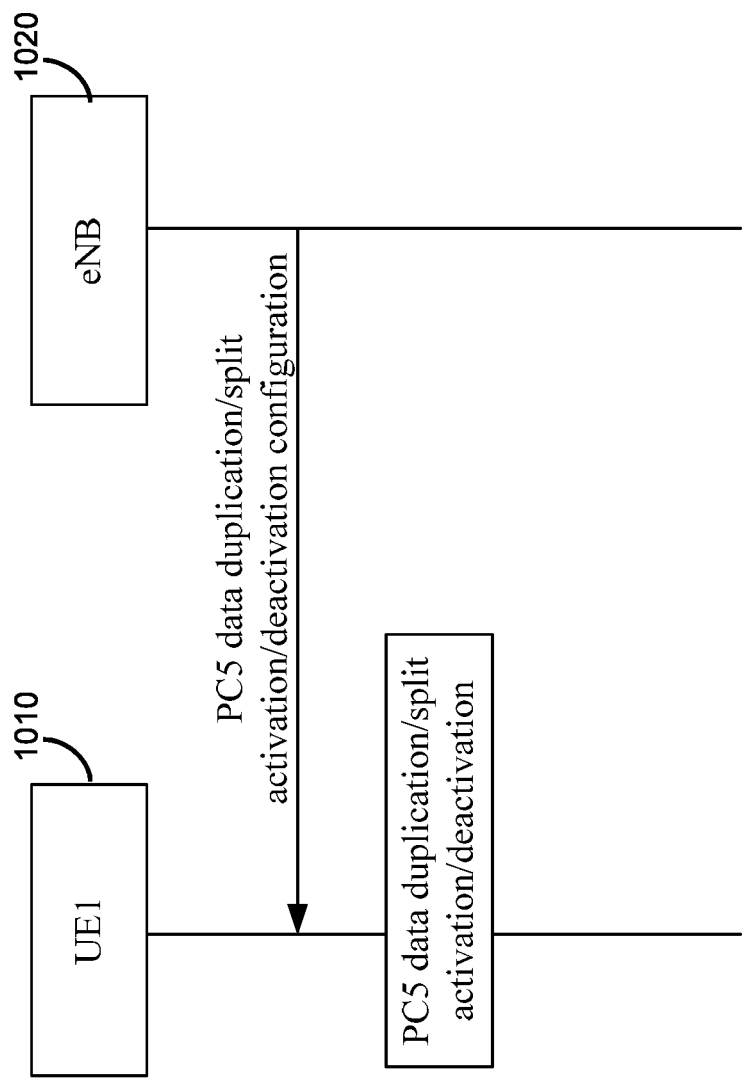
FIG. 10 illustrates an exemplary method for performing activation and deactivation of carrier aggregation at a transmission UE, in accordance with some embodiments of the present disclosure.

First, the Tx UE may autonomously initiate the activation/deactivation of data duplication/data split, as shown in FIG. 10. The autonomous activation/deactivation may be based on the dynamic change of data flow. For the data split, the UE 1010 may be pre-configured or configured by BS 1020 with a data split threshold. If the data arrived at a PC5 RB is higher than the data split threshold, more carriers should be used for this PC5 RB's sidelink data scheduling and transmission. Thus the data split should be activated to support the data transmission over more carriers. Additional RLC entity/logical channel may also be established to support the data split operation. On the other hand, if the data arrived at a PC5 RB is lower than the data split threshold, less carriers should be used for this PC5 RB's sidelink data scheduling and transmission. Thus the data split should be deactivated to support the data transmission over fewer carriers. In addition, the deactivation timer may be configured for the data split. In this case, the activation/deactivation decision could be based on the deactivation timer for data split. Moreover, the data duplication/data split may be based on the change of channel busy ratio and/or channel quality of a given carrier. A UE may be pre-configured or configured by BS with the channel busy ratio threshold and/or channel quality threshold for the UE to determine whether the data duplication/data split on a given carrier should be activated or deactivated.

Figure 11:
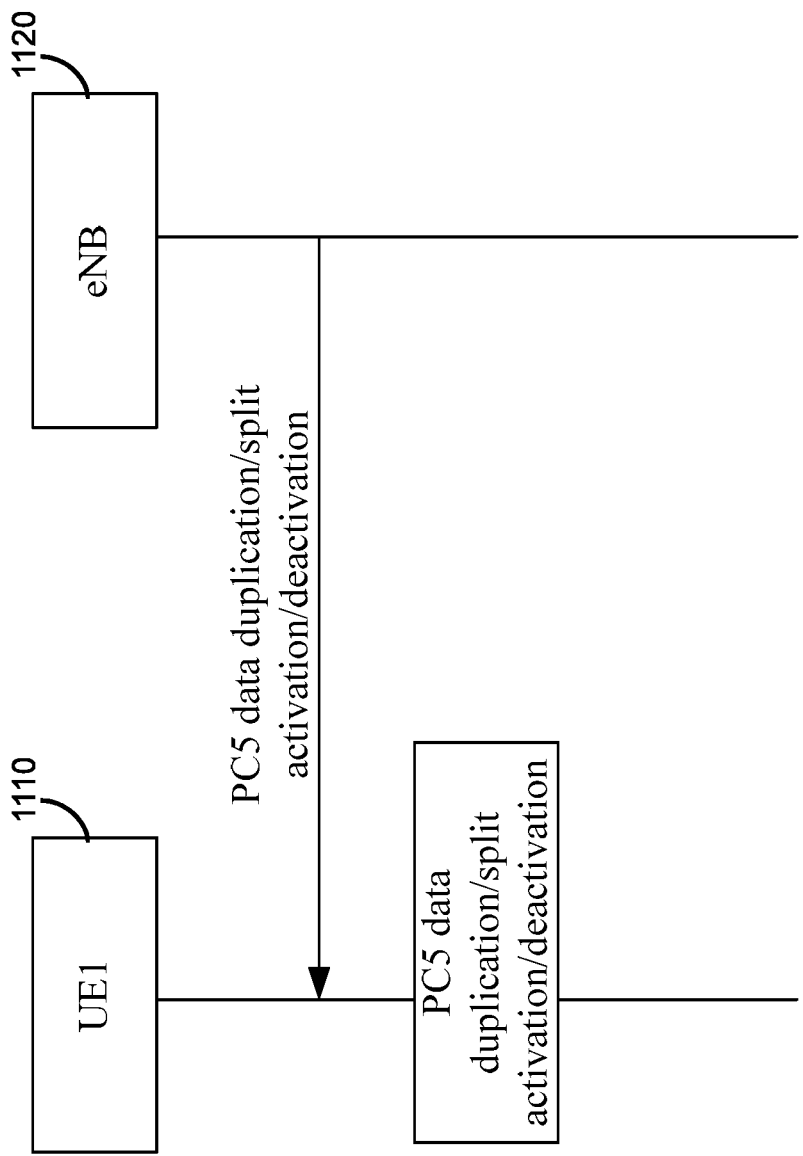
FIG. 11 illustrates another exemplary method for performing activation and deactivation of carrier aggregation at a transmission UE, in accordance with some embodiments of the present disclosure.

Second, as shown in FIG. 11, BS 1120 may send the activation/deactivation command to the Tx UE 1110. For the unicast SL communication, if the BS knows which UE pair is performing unicast SL communication, the BS may also send the activation/deactivation command to Rx UE. To be specific, the activation/deactivation command may be delivered through RRC signaling or MAC CE or PDCP control PDU. It may contain a bitmap or list, each bit or entry indicates the PC5 RB which data duplication/data split should be activated or deactivated. Alternatively, for a given PC5 RB that supports the data duplication/data split, the activation/deactivation command may indicate which logical channels (LCHID) and/or carriers (carrier index) should be activated or deactivated. The PC5 RB ID/logical channel ID is unique only within the scope of one source ID and target ID combination. As such, for the activation/deactivation command sent by the BS, it should also include the target ID as well as the source ID of which the PC5 RB's data duplication/data split to be activated or deactivated.

Figure 12:
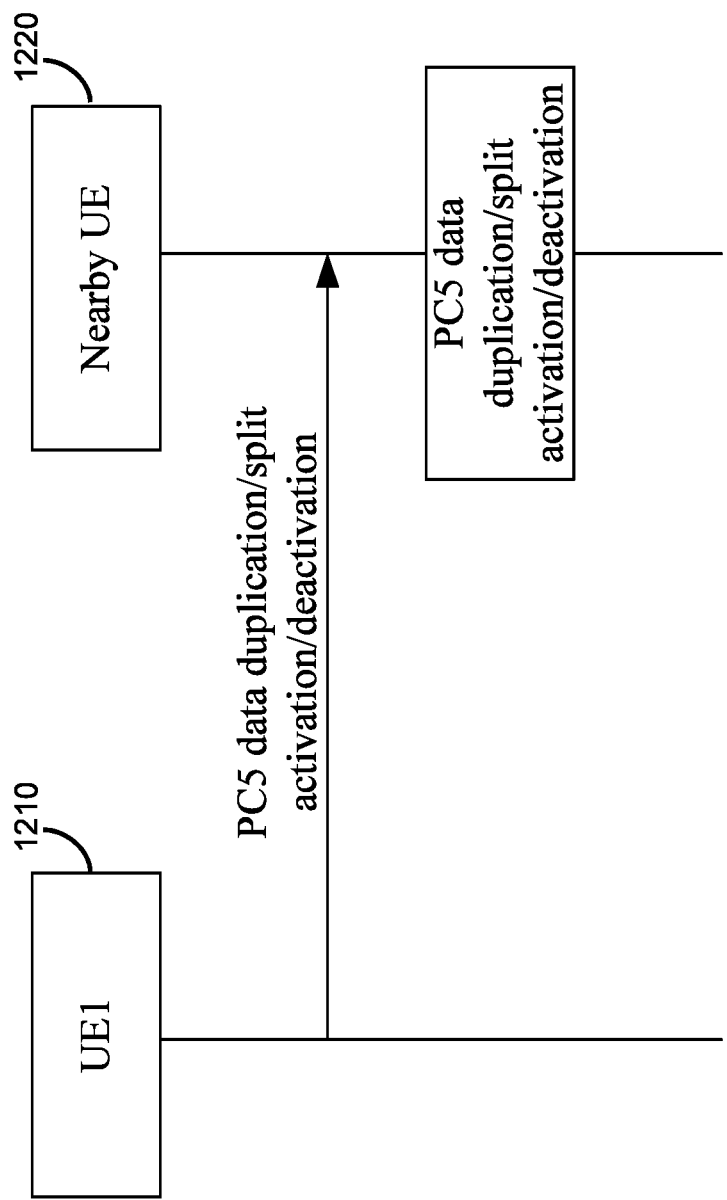
FIG. 12 illustrates an exemplary method for performing activation and deactivation of carrier aggregation at a receiving UE, in accordance with some embodiments of the present disclosure.

Third, as shown in FIG. 12, the Tx UE 1210 may send the activation/deactivation command to the Rx UE 1220. To be specific, the activation/deactivation command may be delivered through RRC signaling or MAC CE or PDCP control PDU. It may contain a bitmap or list, each bit or entry indicates the PC5 RB which data duplication/data split should be activated or deactivated. Alternatively, for a given PC5 RB that supports the data duplication/data split, the activation/deactivation command may indicate which logical channels (LCHID) and or carriers (carrier index) should be activated or deactivated.

For the PC5 data duplication/data split, the Rx PDCP entity is associated with two or even more Rx RLC entities. The PDCP PDUs received from these RLC entities may be duplicated and out of order. So it is desirable to enhance the PDCP Rx processing procedure to support the PDCP reordering and duplicate functionality if data duplication/data split is activated over multiple carriers. To be specific, if the Rx PDCP entity configured to receive the data packet from multiple RLC entities, the Rx PDCP entity may initiate the PDCP reordering and duplicate discard processing.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first user equipment device (UE), the method comprising:
    obtaining configuration information related to a sidelink data transmission between the first UE and at least one second UE, wherein the configuration information comprises one or more rules related to carrier aggregation for the sidelink data transmission, wherein the one or more rules comprise information related to a first predetermined reliability requirement associated with sidelink data of the sidelink data transmission, wherein the first predetermined reliability requirement indicates a minimum percentage of successful transmissions among a total number of transmission attempts;
    determining whether to duplicate the sidelink data based on the first predetermined reliability requirement; and
    transmitting the sidelink data and duplicates thereof to the at least one second UE on a plurality of carriers based on the configuration information.

2. The method of claim 1, further comprising:
    obtaining a sidelink transmission scheme based on the configuration information, wherein the sidelink transmission scheme is related to a data duplication configuration, and wherein the sidelink data are transmitted based on the data duplication configuration.

3. The method of claim 1, further comprising transmitting a sidelink configuration indication to a base station.

4. The method of claim 3, wherein the sidelink configuration indication comprises information related to a second reliability requirement associated with the sidelink data to be transmitted, wherein the information related to the second reliability requirement is reported from the first UE to a network node.

5. The method of claim 1, wherein the configuration information is obtained based on a pre-configuration.

6. The method of claim 1, wherein the configuration information is obtained based on a configuration by a base station.

7. A method performed by a network node, the method comprising:
transmitting configuration information to a first user equipment (UE), wherein the configuration information is related to sidelink data transmission on a plurality of carriers between the first UE and at least one second UE and comprises one or more rules related to carrier aggregation for the sidelink data transmission, wherein the one or more rules comprise information related to a first predetermined reliability requirement associated with the sidelink data transmission, wherein the first predetermined reliability requirement indicates a minimum percentage of successful transmissions among a total number of transmission attempts.

8. The method of claim 7, wherein the configuration information indicates that the network node supports the sidelink data transmission on the plurality of carriers according to a data duplication configuration.

9. The method of claim 7, further comprising receiving a sidelink configuration indication from the first UE, wherein the sidelink configuration indication comprises information related to a second reliability requirement of the sidelink data to be transmitted, wherein the information related to the second reliability requirement is reported from the first UE to the network node.

10. A first user equipment (UE) comprising a processor, a memory and a wireless interface, wherein the memory stores instructions that, when executed, cause the processor to:
obtain configuration information related to sidelink data transmission between the first UE and at least one second UE, wherein the configuration information comprises one or more rules related to carrier aggregation for the sidelink data transmission, wherein the one or more rules comprise information related to a first predetermined reliability requirement associated with the sidelink data transmission, wherein the first predetermined reliability requirement indicates a minimum percentage of successful transmissions among a total number of transmission attempts;
determine whether to duplicate the sidelink data based on the first predetermined reliability requirement; and
transmit the sidelink data and duplicates thereof to the at least one second UE on a plurality of carriers based on the configuration information.

11. The first UE of claim 10, wherein the instructions, when executed, further cause the processor to:
obtain a sidelink transmission scheme based on the configuration information, wherein the sidelink transmission scheme is related to a data duplication configuration, and wherein the sidelink data are transmitted based on the data duplication configuration.

12. The first UE of claim 10, wherein the instructions, when executed, further cause the processor to transmit a sidelink configuration indication to a base station.

13. The first UE of claim 12, wherein the sidelink configuration indication comprises information related to a second reliability requirement of the sidelink data to be transmitted.

14. The first UE of claim 10, wherein the configuration information is obtained based on a pre-configuration.

15. The first UE of claim 10, wherein the configuration information is obtained based on a configuration by a base station.

16. A network node comprising a processor, a memory and a wireless interface, wherein the memory stores instructions that, when executed, cause the processor to:
transmit configuration information to a first user equipment (UE), wherein the configuration information is related to sidelink data transmission on a plurality of carriers between the first UE and at least one second UE and comprises one or more rules related to carrier aggregation for the sidelink data transmission, wherein the one or more rules comprise information related to a first predetermined reliability requirement associated with the sidelink data transmission, wherein the first predetermined reliability requirement indicates a minimum percentage of successful transmissions among a total number of transmission attempts; and
receive a sidelink configuration indication from the first UE, wherein the sidelink configuration indication comprises information related to a second reliability requirement of the sidelink data to be transmitted.

17. The network node of claim 16, wherein the configuration information indicates that the first UE supports the sidelink data transmission on the plurality of carriers according to a data duplication configuration.

18. A non-transitory computer-readable medium having computer-executable instructions stored thereon, the computer-executable instructions, when executed by a processor of a first user equipment (UE), causing the processor to implement a method comprising:
obtaining configuration information related to a sidelink data transmission between the first UE and at least one second UE, wherein the configuration information comprises one or more rules related to carrier aggregation for the sidelink data transmission, wherein the one or more rules comprise information related to a first predetermined reliability requirement associated with sidelink data of the sidelink data transmission, wherein the first predetermined reliability requirement indicates a minimum percentage of successful transmissions among a total number of transmission attempts;
determining whether to duplicate the sidelink data based on the first predetermined reliability requirement; and
transmitting the sidelink data and duplicates thereof to the at least one second UE on a plurality of carriers based on the configuration information.

19. A non-transitory computer-readable medium having computer-executable instructions stored thereon, the computer-executable instructions, when executed by a processor of a network node, causing the processor to implement a method comprising:
transmitting configuration information to a first user equipment (UE), wherein the configuration information is related to sidelink data transmission on a plurality of carriers between the first UE and at least one second UE and comprises one or more rules related to carrier aggregation for the sidelink data transmission, wherein the one or more rules comprise information related to a first predetermined reliability requirement associated with the sidelink data transmission, wherein the first predetermined reliability requirement indicates a minimum percentage of successful transmissions among a total number of transmission attempts; and receiving a sidelink configuration indication from the first UE, wherein the sidelink configuration indication comprises information related to a second reliability requirement of the sidelink data to be transmitted.

* * * * *